(12) United States Patent
Koo et al.

(10) Patent No.: US 9,369,908 B2
(45) Date of Patent: *Jun. 14, 2016

(54) METHOD FOR CONTROLLING CODEC MODE IN ALL-IP NETWORK AND TERMINAL USING THE SAME

(71) Applicant: ELECTRONICS AND TELECOMMUNICATIONS RESEARCH INSTITUTE, Daejeon (KR)

(72) Inventors: Ki Jong Koo, Daejeon (KR); Hyun Joo Bae, Daejeon (KR); Byung Sun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,846

(22) Filed: Nov. 14, 2014

(65) Prior Publication Data

US 2015/0208268 A1    Jul. 23, 2015

Related U.S. Application Data

(63) Continuation of application No. 13/143,840, filed as application No. PCT/KR2010/000090 on Jan. 7, 2010, now Pat. No. 8,908,547.

(30) Foreign Application Priority Data

Jan. 9, 2009 (KR) .................. 10-2009-0002051
Jul. 16, 2009 (KR) .................. 10-2009-0065044

(51) Int. Cl.
*H04W 24/00* (2009.01)
*H04W 24/10* (2009.01)
(Continued)

(52) U.S. Cl.
CPC ............ *H04W 24/10* (2013.01); *H04L 1/0014* (2013.01); *H04L 1/0015* (2013.01);
(Continued)

(58) Field of Classification Search
CPC ...................................................... H04W 24/10
See application file for complete search history.

(56) References Cited

U.S. PATENT DOCUMENTS 6,744,816 B1   6/2004 Park et al.
8,908,547 B2 * 12/2014 Koo et al. ............... 370/252
(Continued)

FOREIGN PATENT DOCUMENTS

JP    2003-249977    9/2003
JP    2006-287895    10/2006
(Continued)

OTHER PUBLICATIONS

International Search Report mailed Sep. 27, 2010 in corresponding International Publication WO 2010/079967.
(Continued)

*Primary Examiner* — John Blanton
(74) *Attorney, Agent, or Firm* — Staas & Halsey LLP

(57) ABSTRACT

A method of controlling the codec mode of a convergence internet protocol (IP) network and a terminal using the method are provided. The terminal may include a variable bit-rate/mode codec controller including a channel status measurement and management (CSMM) unit which measures the status of a wireless channel and provides the results of the measuring of the wireless channel status as channel quality information, and which measures the transfer performance of a received packet and provides the results of the measuring of the packet transfer performance as packet measurement parameter information, and a service quality control (SQC) unit which measures the quality of a multimedia service based on the channel quality information and the packet measurement parameter information, provides the results of the measuring of the multimedia service quality as service quality information and determines a codec mode of the terminal or a counterpart terminal communicating with the all-IP terminal based on the service quality information. Therefore, it is possible to improve the quality of multimedia services.

12 Claims, 6 Drawing Sheets

(51) Int. Cl.
*H04L 1/00* (2006.01)
*H04W 28/22* (2009.01)
*H04L 5/00* (2006.01)
*H04L 29/06* (2006.01)
*H04W 80/04* (2009.01)
*H04W 88/18* (2009.01)

(52) U.S. Cl.
CPC ............ *H04L 5/0057* (2013.01); *H04L 65/80* (2013.01); *H04W 28/22* (2013.01); *H04W 80/04* (2013.01); *H04W 88/181* (2013.01)

(56) References Cited

U.S. PATENT DOCUMENTS

| | | |
|---|---|---|
| 2001/0011216 A1 | 8/2001 | Lee |
| 2003/0145077 A1 | 7/2003 | Khan et al. |
| 2004/0098251 A1 | 5/2004 | Vainio et al. |
| 2004/0160979 A1 | 8/2004 | Pepin et al. |
| 2004/0267519 A1 | 12/2004 | Sjoberg et al. |
| 2006/0285545 A1 | 12/2006 | Schmidt et al. |
| 2007/0183323 A1 | 8/2007 | Hannu et al. |
| 2008/0244148 A1 | 10/2008 | Nix, Jr. et al. |
| 2009/0136216 A1 | 5/2009 | Soroushian et al. |
| 2010/0103828 A1 | 4/2010 | Kuroda et al. |
| 2011/0197229 A1 | 8/2011 | Yassa |

FOREIGN PATENT DOCUMENTS

| | | |
|---|---|---|
| JP | 2006-352894 | 12/2006 |
| JP | 2008-99261 | 4/2008 |
| JP | 2008-113226 | 5/2008 |
| JP | 2009-33685 | 2/2009 |
| JP | 2009-124362 | 6/2009 |
| JP | 2000-201351 | 7/2010 |
| KR | 10-2000-0038675 A | 7/2000 |
| KR | 2000-0038675 | 7/2000 |
| KR | 10-2001-0054171 A | 7/2001 |
| KR | 2001-0054171 | 7/2001 |
| KR | 10-2004-0036200 | 4/2004 |
| KR | 10-2004-0036200 A | 4/2004 |
| KR | 10-0723822 | 5/2007 |
| KR | 10-2007-0060514 | 6/2007 |
| KR | 10-2008-0095132 | 10/2008 |
| KR | 10-0906985 | 7/2009 |
| WO | 2007/073508 | 6/2007 |
| WO | 2007/073508 A1 | 6/2007 |

OTHER PUBLICATIONS

Japanese Office Action mailed Oct. 11, 2013 in corresponding Japanese Application No. 2011-545292.
Advisory Action mailed May 2, 2014 in related U.S. Appl. No. 13/143,840.
Final Office Action mailed Jan. 13, 2014 in related U.S. Appl. No. 13/143,840.
Office Action mailed Jul. 12, 2013 in related U.S. Appl. No. 13/143,840.
Notice of Allowance mailed Aug. 6, 2014 in related U.S. Appl. No. 13/143,840.
U.S. Appl. No. 13/143,840, filed Sep. 27, 2011, Ki Jong Koo, Electronics and Telecommunications Research Institute.

* cited by examiner

METHOD FOR CONTROLLING CODEC MODE IN ALL-IP NETWORK AND TERMINAL USING THE SAME

CROSS REFERENCE TO RELATED APPLICATIONS

This application is a continuation application of U.S. application Ser. No. 13/143,840 filed Sep. 27, 2011, which claims the benefit of International Application No. PCT/KR2010/000090, filed Jan. 7, 2010, and claims the benefit of Korean Application No. 10-2009-0002051, filed Jan. 9, 2009, and Korean Application No. 10-2009-0065044, filed Jul. 16, 2009, the disclosures of all of which are incorporated herein by reference.

TECHNICAL FIELD

The present invention relates to a method of controlling the codec mode of a convergence internet protocol (IP) network and a terminal using the method.

BACKGROUND ART

Link adaptation for mobile communication networks is used to control an audio codec mode having variable bitrate properties based on the quality of wireless channels. A channel quality indicator (CQI), which is a measurement of the communication quality of wireless channels, may be defined as a carrier-to-interferer ratio (CIR). Since, in most codec mode control methods for mobile communication networks, the quality of transfer of packets via the internet is not considered, it is difficult to provide high quality of service (QoS) multimedia services in mobile environments such as a convergence internet protocol (IP) network where the transfer performance of packets are highly variable.

DISCLOSURE

Technical Problem

The present invention provides a method of controlling the codec mode of a convergence internet protocol (IP) network and a terminal using the method, in which the quality of multimedia services, including audio services, can be improved by performing codec mode control in a convergence IP network in consideration of the quality of wireless channels and the quality of transfer of packets.

Technical Solution

According to an aspect of the present invention, there is provided a terminal in a convergence internet protocol (IP) network including a variable bit-rate/mode codec controller including a channel status measurement and management (CSMM) unit which measures the status of a wireless channel and provides the results of the measuring of the wireless channel status as channel quality information, and which measures the transfer performance of a received packet and provides the results of the measuring of the packet transfer performance as packet measurement parameter information, and a service quality control (SQC) unit which measures the quality of a multimedia service based on the channel quality information and the packet measurement parameter information, provides the results of the measuring of the multimedia service quality as service quality information and determines a codec mode of the terminal or a counterpart terminal communicating with the all terminal based on the service quality information.

According to another aspect of the present invention, there is provided a method of controlling the codec mode of a convergence IP network, the method including measuring the transfer performance of a received packet and thus providing the results of the measuring of the packet transfer performance as packet measurement parameter information; measuring the quality of a multimedia service based on the packet measurement parameter information and providing the results of the measuring of the multimedia service as service quality information; and determining a codec mode based on the service quality information.

Advantageous Effects

According to the present invention, it is possible to perform codec mode control based on channel quality information and packet measurement parameter information and thus to improve the quality of multimedia services including audio and video services. In addition, according to the present invention, it is possible to improve user satisfaction with multimedia services.

BEST MODE

The present invention will hereinafter be described more fully with reference to the accompanying drawings, in which exemplary embodiments of the invention are shown.

More specifically, it will hereinafter be described in detail how to control the quality of variable codec-based multimedia services in a convergence internet protocol (IP) network.

Figure 1:
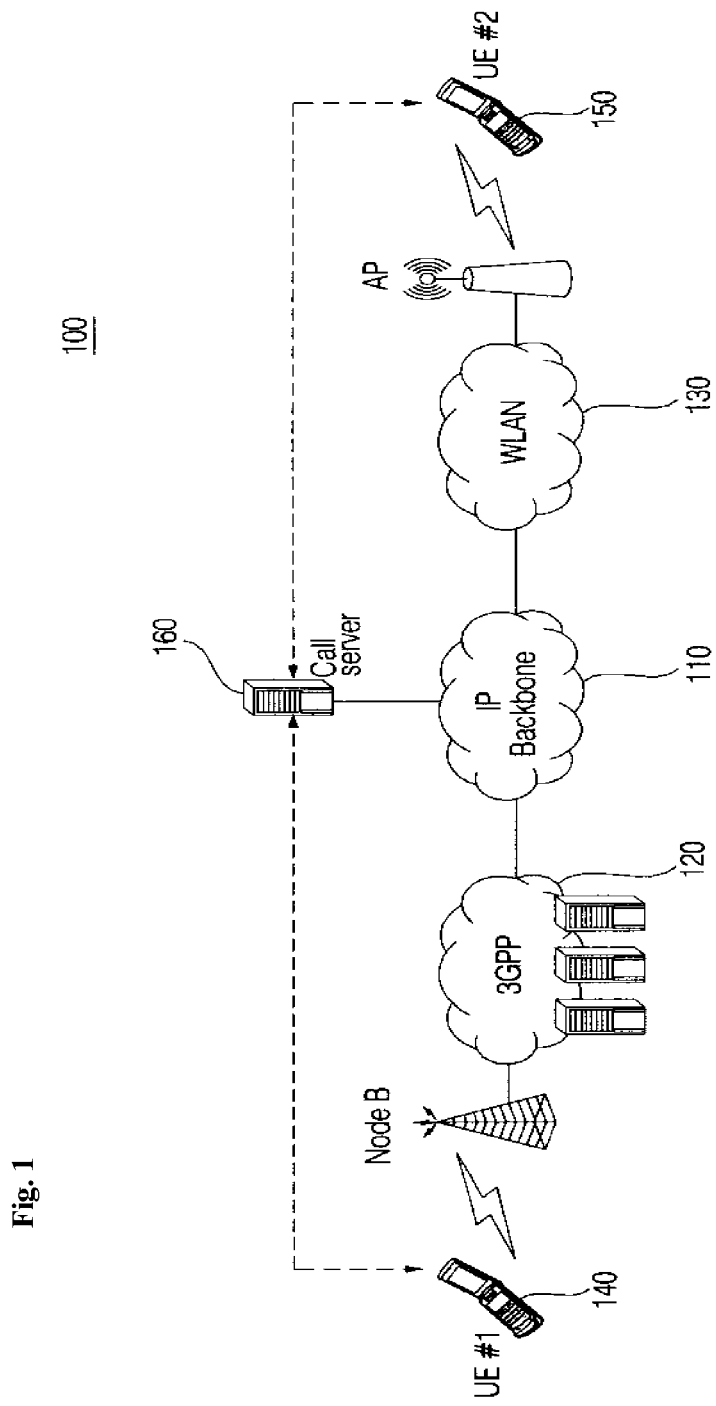
FIG. 1 illustrates a schematic diagram of a convergence internet protocol (IP) network to which the present invention can be applied.

FIG. 1 illustrates a schematic diagram of a convergence internet protocol (IP) network 100 to which the present invention can be applied. Referring to FIG. 1, the network 100 may be the fixed mobile convergence (FMC) network 100. The FMC network 100 may include an IP backbone network 110, a wireless mobile communication network 120 and a wireless local area network (WLAN) 130. The wireless mobile communication network 120 is illustrated in FIG. 1 as being a third-generation (3G) wideband code division multiple access (WCDMA)/high speed downlink packet access (HSPDA) network, but the present invention is not restricted to this. That is, the wireless mobile communication network 120 may be a WiMax network, a WiBro network or a 3G Partnership Project (3GPP) long-term evolution (LTE) network.

The network 100 may also include first and second terminals 140 and 150 which may be used in the convergence IP network. The first and second terminals may be the fixed mobile convergence (FMC) terminals. Each of the first and second FMC terminals 140 and 150 may be equipped with a variable bit-rate/mode codec and a variable bit-rate/mode codec controller. The first FMC terminal 140 may be connected to the IP backbone network 110, the wireless mobile communication network 120 and the WLAN 130 via a node B, and the second FMC terminal 150 may be connected to the IP backbone network 110, the wireless mobile communication network 120 and the WLAN 130 via an access point (AP). A call server 160 may be connected to the IP backbone network 110 between the first and second FMC terminals 140 and 150.

Figure 2:
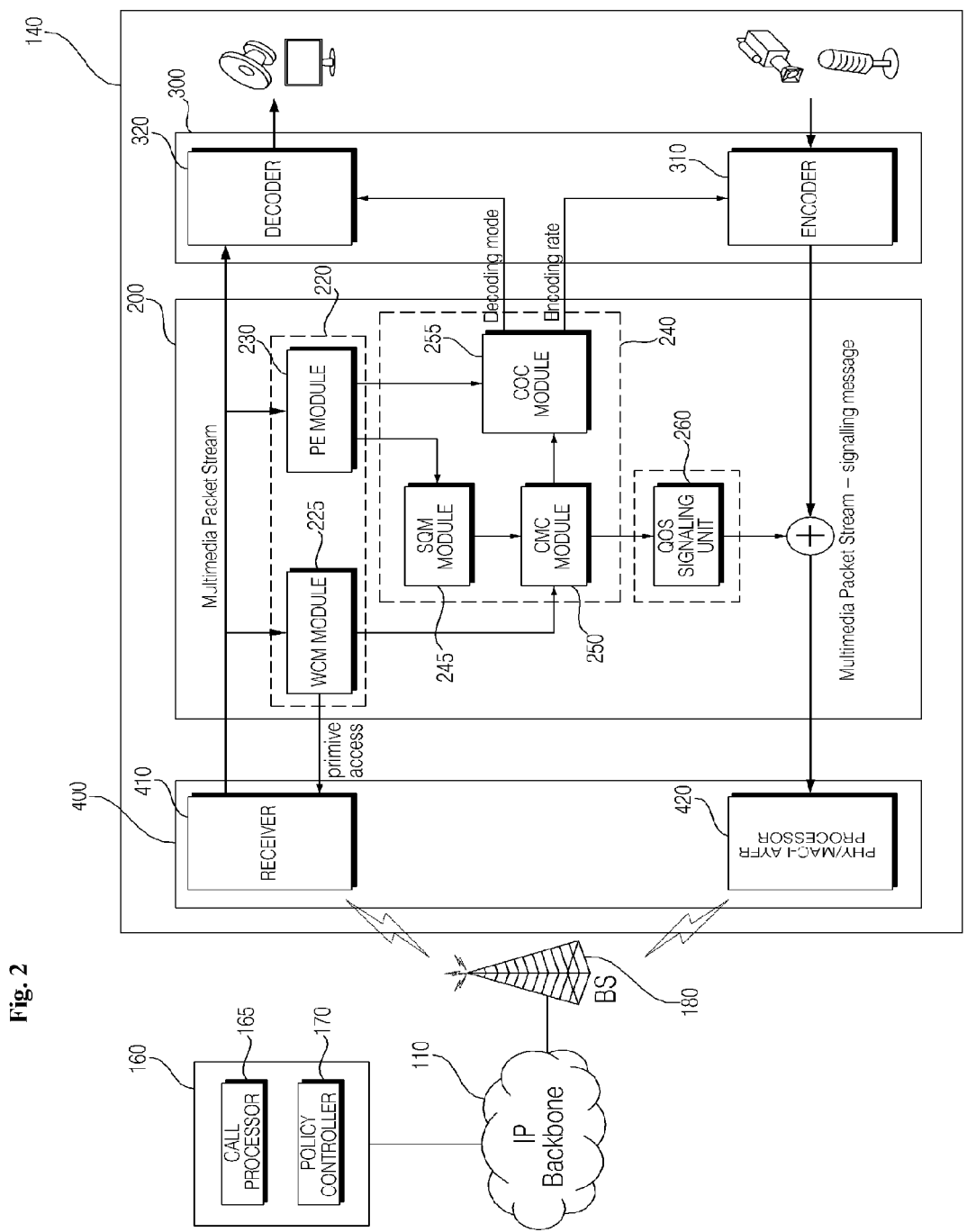
FIG. 2 illustrates a block diagram of a terminal shown in FIG. 1.

Each of the first and second FMC terminals 140 and 150, which can be used in a convergence IP network into which a wired/wireless data network and a mobile communication network are incorporated, may include a variable bit-rate/mode codec controller 200, as shown in FIG. 2. The structure and operation of the variable bit-rate/mode codec controller 200 will be described later in further detail with reference to FIG. 2.

Referring to FIG. 1, the first and second FMC terminals 140 and 150 may be seamlessly provided with services even when being handed over between different wired networks (such as PTSN, ISDN, xDSL and WAN/LAN) or between different wireless networks (such as 3G and WiBro) and may be able to provide terminal mobility, service mobility and session mobility.

The first and second FMC terminals 140 and 150 are illustrated in FIG. 1 as being mobile phones, but the present invention is not restricted to this. That is, the first and second FMC terminals 140 and 150 may be netbooks, laptop computers, or desktop computers.

The call server 160 may perform terminal service policy control in order to properly perform variable bit-rate/mode codec control on the first and second FMC terminals 140 and 150.

FIG. 2 illustrates a block diagram of one of the first and second terminals 140 and 150, and particularly, the first terminal 140. Referring to FIG. 2, each of the first and second FMC terminals 140 and 150 may include the variable bit-rate/mode codec controller 200, a codec unit 300 and an interface 400. The variable bit-rate/mode codec controller 200 may include a channel status measurement and management (CSMM) unit 220, a service quality control (SQC) unit 240, a quality-of-service (QoS) signalling unit 260.

The CSMM unit 220 may include a wireless channel measurement (WCM) module 225 and a packet evaluation (PE) module 230.

The WCM module 225 may measure the quality of a wireless channel based on data extracted from a physical (PHY)-layer frame or a media control access (MAC) layer-frame received by a receiver 410 of the interface 400 or based on wireless link access information that can be measured by the first FMC terminal 140.

The PE module 230 may determine the transfer performance of multimedia packets and those control packets transmitted or received by the first FMC terminal 140, and may extract information necessary for decoding multimedia data.

The service quality control (SQC) unit 240 may include a service quality measurement (SQM) module 245, a codec mode control (CMC) module 250, and a codec operation control (COC) module 255.

The SQM module 245 may measure the quality of a received multimedia service based on packet measurement parameter information provided by the CSMM unit 220 and information regarding a multimedia codec currently being used, and may provide the results of the measurement as multimedia service quality information.

The CMC module 250 may determine a codec mode for the first FMC terminal 140 or for another FMC terminal communicating with the first FMC terminal 140, for example, the second FMC terminal 150, based on wireless channel quality status information provided by the CSMM unit 220 and the multimedia service quality information provided by the SQM module 245.

The CMC module 250 may receive a codec mode change request from the second FMC terminal 150 and may determine the codec mode of the first FMC terminal 140 based on multimedia codec information received from a policy controller 170 of the call server 160.

The COC module 255 may control encoding information or decoding information of multimedia data according to the codec mode of the first or second FMC terminal 140 or 150 determined by the CMC module 250.

The QoS signalling unit 260 may transmit a codec mode change request for a switch to the codec mode determined by the CMC module 250 to the second FMC terminal 150. In addition, the QoS signalling unit 260 may receive a codec mode change request from the second FMC terminal 150 and may respond to the received codec mode change request.

The codec unit 300 may include an encoder 310 and a decoder 320 for processing multimedia data.

The codec unit 300 may encode or decode multimedia data according to the codec mode determined by the variable bit-rate/mode codec controller 200.

The encoding or decoding of multimedia data will hereinafter be described in detail. Multimedia data, and particularly, audio data, may be encoded or decoded using various audio codec modes such as a series of G.7XX standards (including G.711 through G.729), Audio Coding 3 (AC3), Advanced Audio coding (AAC) and Windows Media Audio (WMA). On the other hand, video data may be encoded or decoded using various video codec modes such as a series of MPEG standards, a series of H.26X standards, VC-1 and WMA.

The codec unit 300 may encode or decode multimedia data at a variable bitrate VBR in the codec mode determined by the variable bit-rate/mode codec controller 200 so as to efficiently adjust the bitrate allocated per each bit. For example, the codec unit 300 may encode or decode audio data of multimedia data in an audio codec mode such as MP3, WMA or AAC at a VBR. In addition, the codec unit 300 may encode or decode video data of multimedia data in a video codec mode such as MPEG-2 at a VBR.

Channel quality information may be used to vary the codec mode of the first FMC terminal 140 based on packet measurement parameter information and thus to improve the quality of multimedia services including audio and/or video services.

The interface 400 may include the receiver 410 and a transmitter 420 for wirelessly communicating with the second FMC terminal 150.

The receiver 410 may receive encoded multimedia data, a codec mode change request, and/or a PHY-layer or MAC-layer frame from the second FMC terminal 150. The transmitter 420 may transmit a codec mode change request issued by the QoS signalling unit 260 or encoded multimedia data provided by the codec unit 300 to the second FMC terminal 150.

The call server 160 may include a call processor 165 for processing calls and the policy controller 170 for performing codec mode control. The policy controller 170 may transmit multimedia codec information at the stage of an initial setup operation.

Figure 3:
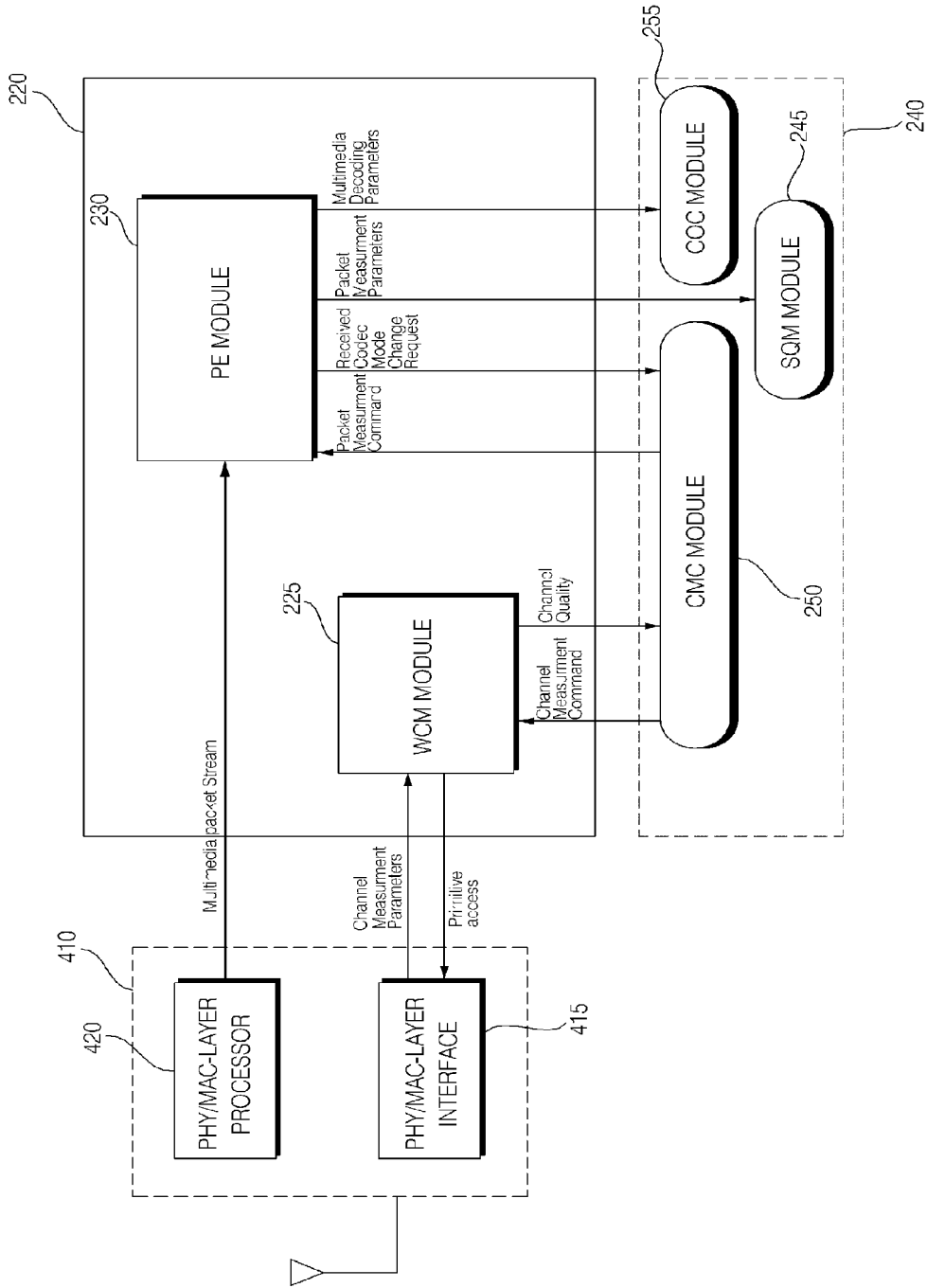
FIG. 3 illustrates a detailed functional block diagram of the terminal shown in FIG. 2.

FIG. 3 illustrates a detailed functional block diagram of the first FMC terminal 140 shown in FIG. 2. Referring to FIG. 3, the CSMM unit 220 may measure the status of a wireless channel during a call via a PHY/MAC-layer interface 415 of the receiver 410 and may provide the results of the measurement as channel quality information.

The CSMM unit 220 may measure the transfer performance (such as delays, jitters or data loss) of an audio packet received from, for example, the second FMC terminal 150 and may provide the results of the measurement as packet measurement parameter information.

The channel quality information and the packet measurement parameter information may be transmitted to the SQC unit 240 and may thus be used in codec mode control for the second FMC terminal 150 during a call.

The operation of the CSMM unit 220 will hereinafter be described in further detail. The WCM module 225 may receive a channel measurement command and may extract a plurality of channel measurement parameters such as received signal strength indicator (RSSI) data, received frame transmission rate, and received frame loss rate in response to the channel measurement command. Thereafter, the WCM module 225 may transmit the extracted wireless channel measurement parameters to the CMC module 250 of the SQC unit 240.

The PE module 230 may receive a packet measurement command from the SQC unit 240, and may measure the transfer performance (such as delays, jitters and loss) of a multimedia packet stream received from, for example, the second FMC terminal 150, and including multimedia data and a control packet. Thereafter, the PE module 230 may provide the results of the measurement to the SQM module 245 of the SQC unit 240.

The PE module 230 may extract various multimedia decoding parameters necessary for the operation of the decoder 320 such as decoding rate and mono/stereo information and may transmit the extracted multimedia decoding parameters to the COC module 255.

The PE module 230 may transmit a codec mode change request received from, for example, the second FMC terminal 150, to the CMC module 250 of the SQC unit 240.

Figure 4:
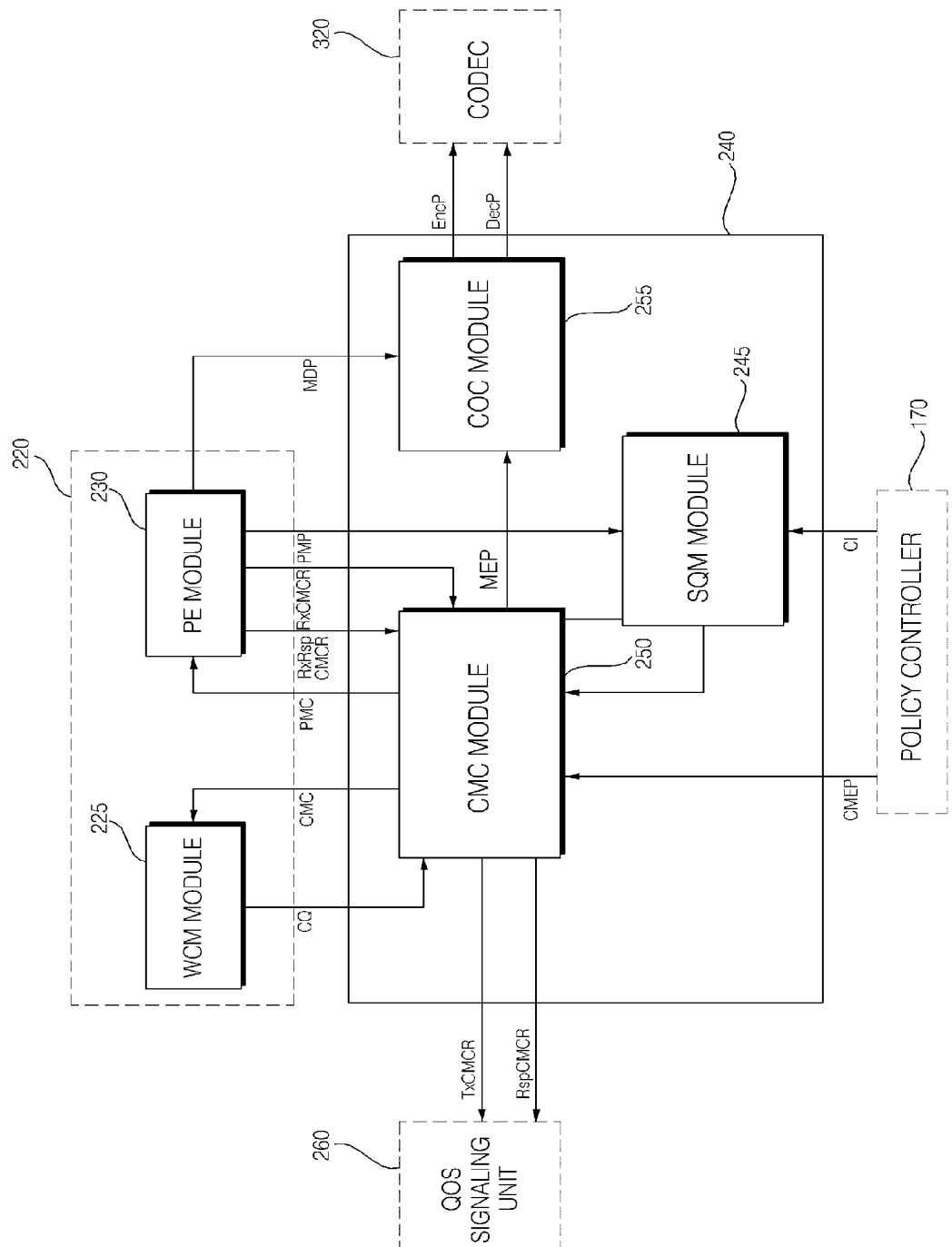
FIG. 4 illustrates another detailed functional block diagram of the terminal shown in FIG. 2.

FIG. 4 illustrates another detailed functional block diagram of the first FMC terminal 140 shown in FIG. 2. Referring to FIG. 4, the SQC unit 240 may receive channel quality information CQ, packet measurement parameter information PMP, and codec information from the CSMM unit 220 and may measure the quality of a received multimedia service. Thereafter, the SQC unit 240 may control the codec mode of, for example, the second FMC terminal 150, based on the results of the measurement.

In addition, the SQC unit 240 may extract a plurality of multimedia decoding parameters MDP from a received multimedia packet, and may control the decoder 320 based on the extracted multimedia decoding parameters MDP. Moreover, the SQC unit 240 may extract codec mode information CM from a codec mode change request RxCMCR received from, for example, the second FMC terminal 150, and may apply a codec mode corresponding to the codec mode information CM to the encoder 310.

More specifically, the SQM module 245 of the SQC unit 240 may measure the quality of a multimedia service, which is received during a call between the first FMC terminal 140 and the second FMC terminal 150, based on packet measurement parameter information PMP provided by the PE module 230 and multimedia codec information currently being used, and may provide the results of the measurement to the CMC module 250 as service quality information SQ.

Thereafter, the CMC module 250 may determine the codec mode of the first FMC terminal 140 or the codec mode of the second FMC terminal 150 based on the channel quality information CQ provided by the WCM module 225 of the CSMM unit 220 and the service quality information SQ provided by the SQM module 245 of the SQC unit 240.

Thereafter, the COC module 255 may receive various information necessary for encoding or decoding the received multimedia packet, i.e., a plurality of multimedia encoding parameters MEP or the multimedia decoding parameters MDP, from the CMC module 250 and the PE module 230, and may control various information EncP and DecP necessary for the operation of a multimedia codec such as sampling rate, mono/stereo mode information and input/output file information.

Figure 5:
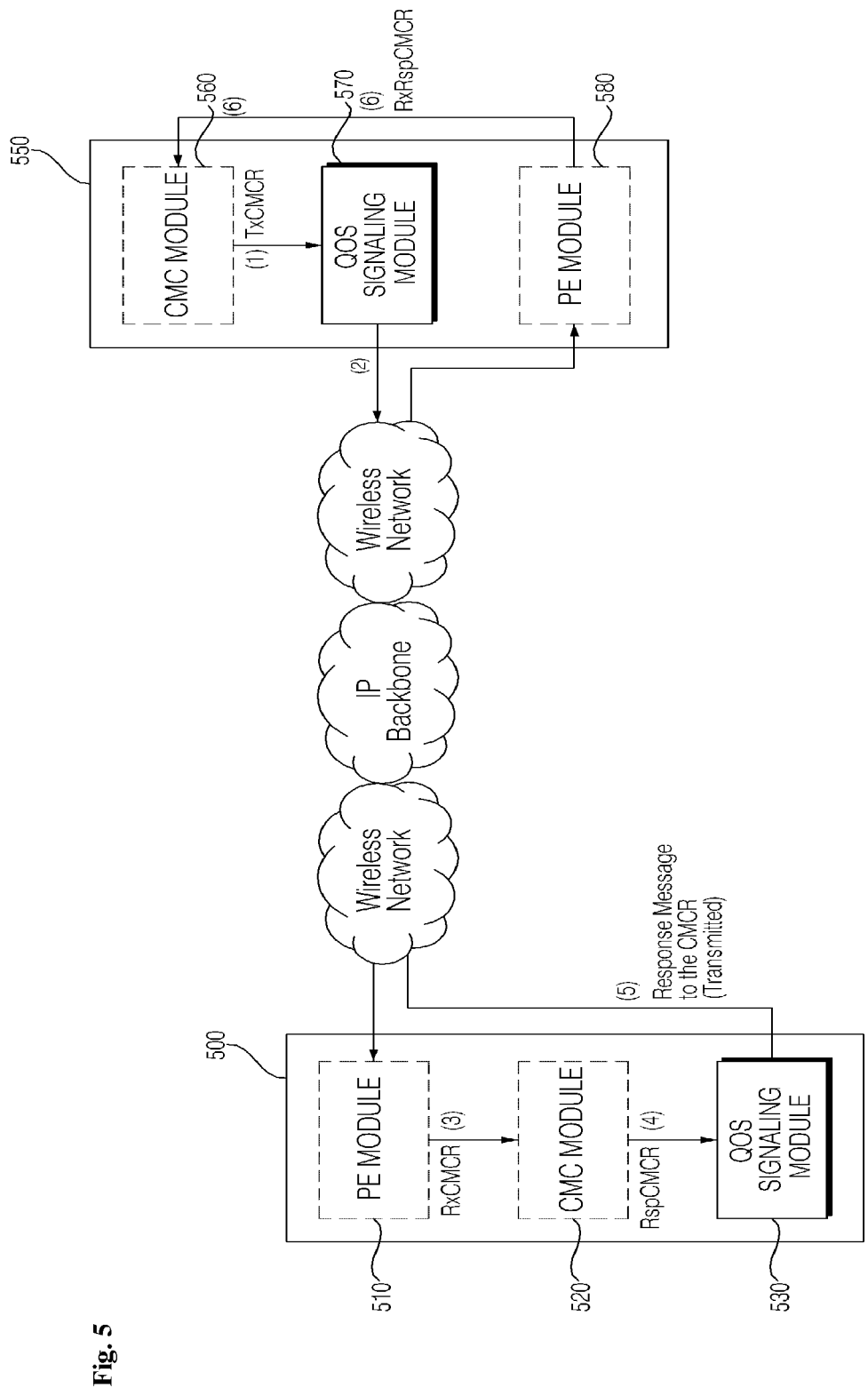
FIG. 5 illustrates a schematic diagram for explaining quality-of-service (QoS) signaling performed between first and second terminals.

FIG. 5 illustrates a schematic diagram for explaining QoS signaling performed between first and second terminals 500 and 550. Referring to FIG. 5, the first terminal 500 may include a PE module 510, a CMC module 520, and a QoS signaling module 530. The second terminal 550 may include a CMC module 560, a QoS signaling module 570, and a PE module 580.

When a codec mode change request TxCMCR is output by the CMC module 560, the QoS signaling module 570 may generate a QoS signaling message corresponding to an application layer and may transmit the QoS signaling message to the first terminal 500 via a network.

Thereafter, the PE module 510 may output a received codec mode change request RxCMCR. Then, the CMC module 520 may output a response message RspCMCR for the received codec mode change request RxCMCR, and may thus request the QoS signaling module 530 to perform QoS signaling. The QoS signaling module 530 may transmit the response message RspCMCR to the second terminal 550 via a network.

Thereafter, the PE module 580 may receive the response message RspCMCR, and may transmit the received response message RxRspCMCR to the CMC module 560.

Figure 6:
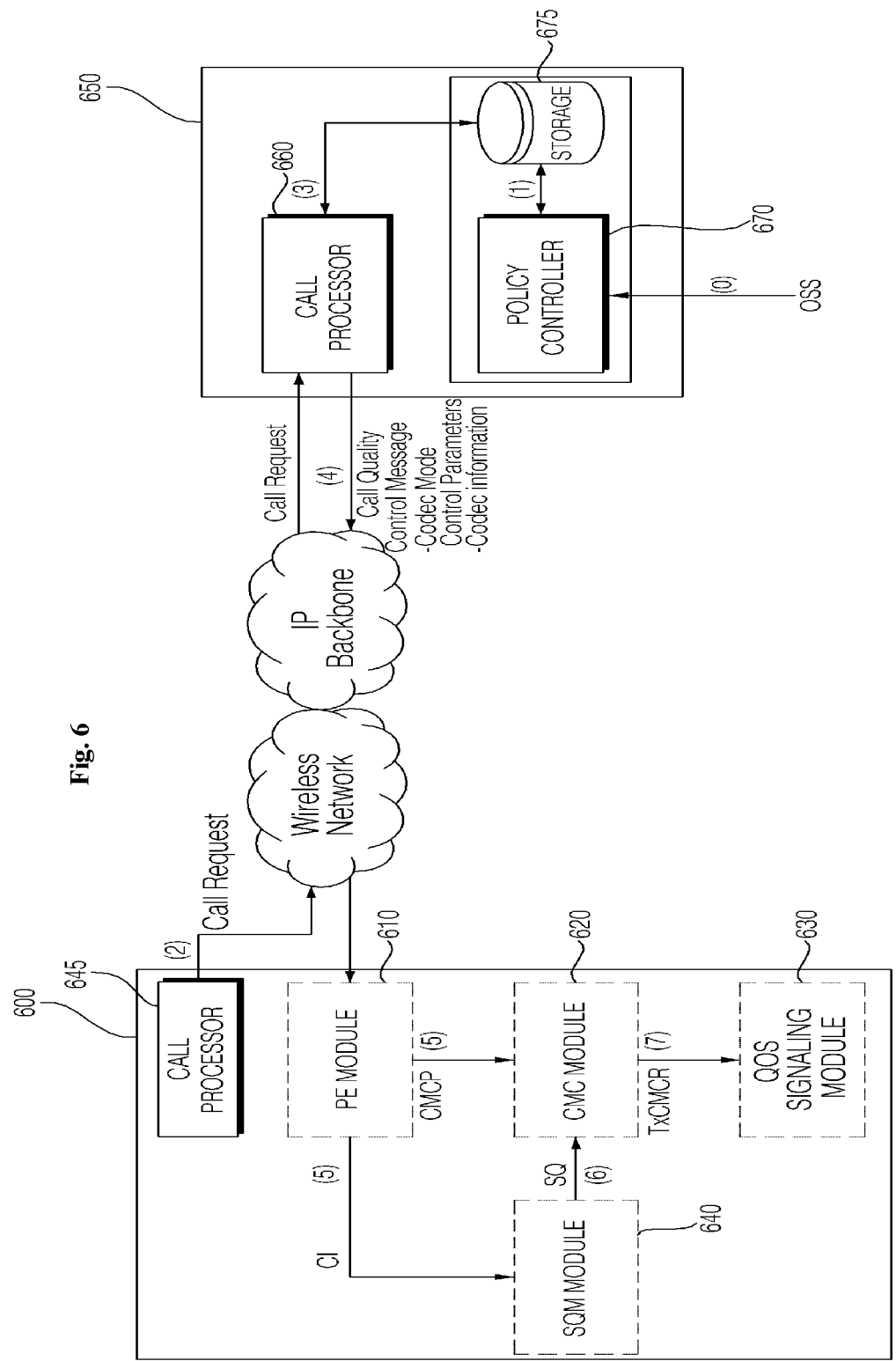
FIG. 6 illustrates a schematic diagram for explaining policy control performed between a terminal and a call server.

FIG. 6 illustrates a schematic diagram for explaining policy control performed between a terminal 600 and a call server 650. Referring to FIG. 6, the terminal 600 may include a PE module 610, a CMC module 620, a QoS signaling module 630, and a SQM module 640.

The call server 650 may include a call processor 660 processing calls and a policy controller 670 performing CMC. The call server 650 may also include a storage 675 storing data provided by the policy controller 670.

The policy controller 670 may receive service level information from the terminal 600 by interfacing with the terminal 600. In addition, the policy controller 670 may store various reference values for accepting, modifying and denying calls in the storage 670 as user profile information.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A terminal, comprising:
   a processor; and
   a codec controller, controlled by the processor, including
   a channel status measurement and management (CSMM) unit adapted to measure a status of a wireless channel as a first measurement and provide results of the first measurement as channel quality information, and measure a transfer performance of a received packet as a second measurement and provide results of the second measurement as packet measurement parameter information, and
   a service quality control (SQC) unit adapted to measure a quality of a service based on the channel quality information and the packet measurement parameter information, provide results of the measuring of the service quality as service quality information and determine a codec mode of the terminal in a convergence IP network communicating with the terminal based on the service quality information,
   wherein the CSMM unit includes a wireless channel measurement (WCM) module adapted to measure the quality of the wireless channel, and a packet evaluation (PE) module which measures the transfer performance of the received packet.

2. The terminal of claim 1, wherein the codec controller includes a quality-of-service (QoS) signaling unit adapted to transmit a codec mode change request to switch the codec mode determined by the SQC unit to the counterpart terminal,
   wherein the QoS signaling unit receives a codec mode change request from the counterpart terminal and responds to the received codec mode change.

3. The terminal of claim 1, wherein the WCM module measures the quality of the wireless channel using a physical (PHY)-layer or media access control (MAC)-layer frame received via a receiver of the terminal or using wireless link access information that can be measured by the terminal.

4. The terminal of claim 1, wherein the PE module measures the transfer performance of multimedia packets and those control packets transmitted between the terminal and the counterpart terminal and extracts information for decoding multimedia data.

5. The terminal of claim 1, wherein the SQC unit includes
   a service quality measurement (SQM) module (which measures the quality of the multimedia service with the packet measurement parameter information provided by the CSMM unit and information regarding a multimedia codec currently being used and thus provides the results of the measuring of the multimedia service quality as the service quality information), and
   a codec mode control (CMC) module (which determines the codec mode based on the service quality information).

6. The terminal of claim 5, wherein the SQC module further includes a codec operation control (COC) module adapted to control information for encoding or decoding multimedia data according to the codec mode determined by the CMC module,
   wherein information for encoding or decoding multimedia data is sampling rate, mono/stereo mode information or input/output file information.

7. The terminal of claim 1, further comprising a codec unit encoding or decoding multimedia data,
   wherein the codec unit encodes or decodes the multimedia data according to the codec mode determined by the CMC module.

8. The terminal of claim 1, wherein the codec controller determines the codec mode of the terminal based on the codec mode of the counterpart terminal.

9. The terminal of claim 1, wherein the codec mode includes an encoding mode and a decoding mode.

10. The terminal of claim 1, wherein the codec mode includes a variable bit rate (VBR) mode.

11. The terminal of claim 1, wherein the channel quality information is received signal strength indicator (RSSI) data, received frame transmission rate, or received frame loss rate.

12. The terminal of claim 1, wherein the packet measurement parameter information comprises delays, jitters or data loss.

* * * * *